Sept. 5, 1950  H. K. WHEELER, JR  2,521,195
FLUIDIZED SOLIDS CONVERSION SYSTEM
Filed Sept. 11, 1945
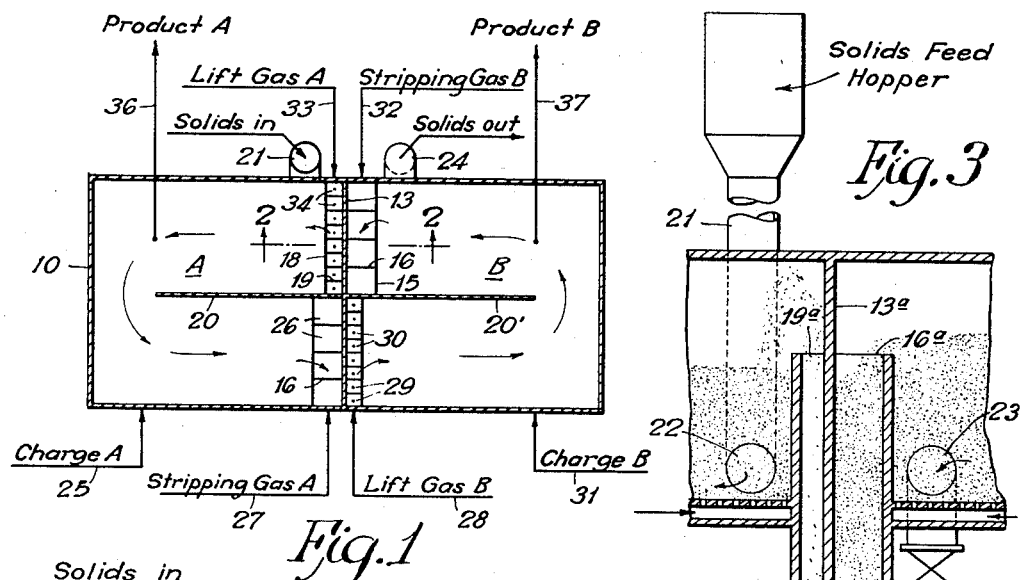
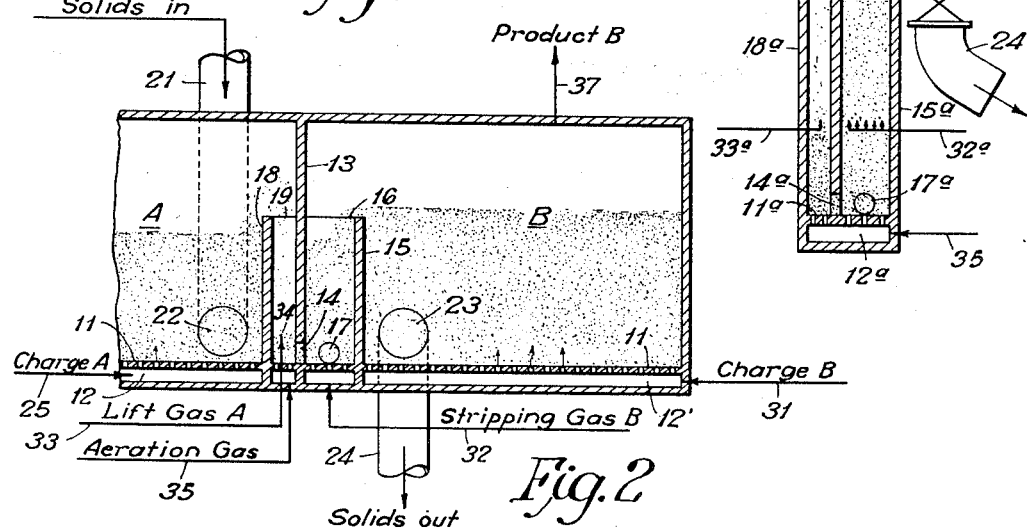
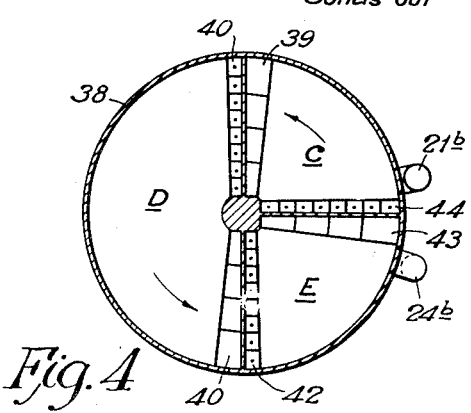
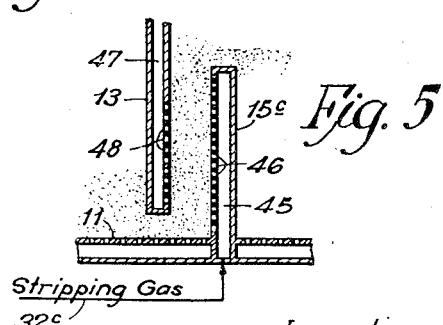
Inventor:—
Harry K. Wheeler, Jr.
By Donald E. Payne
Attorney Patented Sept. 5, 1950

2,521,195

UNITED STATES PATENT OFFICE 2,521,195

FLUIDIZED SOLIDS CONVERSION SYSTEM

Harry K. Wheeler, Jr., Chicago, Ill., assignor to Standard Oil Company, Chicago, Ill., a corporation of Indiana Application September 11, 1945, Serial No. 615,681

8 Claims. (Cl. 23—284)

This invention relates to a fluidized solids conversion system and it pertains more particularly to improved methods and means for controlling the cyclic flow of solids through such a system, particularly when such system operates at such high temperatures as to make the use of metal construction impracticable.

Fluidized solids conversion systems are now in large scale commercial use for the catalytic cracking of hydrocarbons and the fundamental principles thereof are set forth in Oil and Gas Journal, March 3, 1945, pages 64–81. Such systems, however, are not suitable for reactions of the order of 1500 to 2000° F. or higher and an object of my invention is to provide an improved method and means for effecting conversions with fluidized solids at such high temperatures. A further object is to avoid the necessity of employing valves for controlling solids flow and at the same time to maintain effective seals between parts of the system wherein different reactant gases are treated so that one reactant gas stream will not be unduly contaminated with another. A further object is to effect greater simplification at a substantial decrease in construction and operating costs of a high temperature fluidized solids conversion system. A further object is to provide a unitary system for separately contacting at least two separate gasiform solids with a circulating mass of fluidized solids in a single chamber.

A particular object of the invention is to provide a system in which solids transfer from one zone to another is unaffected by the particular bulk density of the fluidized solids in either of said zones and is controlled by regulating gas velocities in the transfer zones themselves. A further object is to provide an improved method and means for effecting solids removal at an upper lever of a contacting zone and solids introduction at an upper level of a succeeding contacting zone. Other objects will be apparent as the detailed description of the invention proceeds.

Briefly, my invention contemplates a contacting system provided with weirs or baffles for maintaining a predetermined depth of fluidized solids in each zone. Solids flow from each zone through one or more wells or conduits which are similar in function to the conduits illustrated in Figure 2 of U. S. Letters Patent 2,341,193 but which are preferably formed by non-metallic baffles of refractory material such as firebrick. In the system of U. S. 2,341,193, however, the flow of solids through the conduits is dependent upon the difference in solids densities in the conduits and in the contact chambers respectively so that variations in such densities cause variations in solids flow which in turn necessitate the use of control valves. In accordance with my invention the solids from the bottom of said wells or conduits are introduced into the adjacent contacting zone by gas lift through a chimney so that such solids are introduced at the top of succeeding zones instead of at the base thereof.

My solids transfer system provides many advantages of outstanding importance. In the first place, the operation of the transfer means is entirely independent of the fluidized solids densities in the contacting zones themselves and any variation in said densities due to surging or to any other cause has no effect on the rate of solids flow through the transfer means. In the next place, a much greater pressure differential is available for effecting solids transfer; in the gas lift chimney the bulk density of the solids may be as low as 1 or 2 pounds per cubic foot (or even lower) while the bulk densities of the solids in the contacting zones themselves may be of the order of 20 pounds per cubic foot or more so that with a fluidized solids depth of about 5 feet and a density in the downcomer wells of about 30 pounds per cubic foot, the available pressure differential for a system of the type illustrated in U. S. Letters Patent 2,341,193 would be less than 0.4 pound per square inch while with my gas lift chimney the available pressure for solids transfer would amount to approximately 1 pound per square inch. Furthermore, if solids densities in the contacting zones approach the densities of the conduits illustrated in U. S. 2,341,193, the pressure differential for obtaining solids flow will be practically nil while in my system the solids densities in the contacting zones may be even higher than the densities in the transfer zones without in any way interfering with the rate of solids transfer. My system avoids entirely the necessity of employing valves; a fluidized mass of solids at the base of the chimney and downcomer column serves as a seal to prevent gas bypassing even if the flow of solids to the wells or conduits (and hence solids transfer) is interrupted.

The solids transfer aspects of my invention are applicable to contacting systems generally whether fabricated from metal or refractory material and whether constructed as a unitary system or as separate contacting chambers. In the preferred embodiment of my invention, however, I employ a unitary contacting chamber constructed of a low thermal expanding refractory such as firebrick. A vertical partitioned baffle extending to the chamber ceiling divides the chamber into two separate contacting zones, additional of such partitioned baffles being employed when more than two contacting zones are desired. This vertical baffle extends to a point adjacent the base of the chamber or it may constitute a wall in the chamber and be provided with openings at its base. One or more downcomer wells or conduits are formed on one side of said baffle by a weir or downcomer baffle extending from the base of the chamber to the predetermined fluidized solids height in the contacting zone and being substantially parallel to the partition baffles. One or more gas lift chimneys are provided on the opposite side of the partitioned baffle by a chimney baffle which likewise is substantially parallel to the partitioned baffle and which preferably extends to the predetermined level of solids to be maintained in the second contacting zone. Transfer is effected primarily by the gas lift effect in the chimney and the lift gas enters the second contacting zone while a stripping gas may be passed upwardly through the well or conduit into the first contacting zone. The chamber itself is preferably circular, but it may be rectangular or any desired shape as long as it provides for a circular flow of solids. It is provided with suitable gas distributors at its base. Aeration gas may be introduced at the base of the downcomer conduit and chimney respectively.

While my invention is applicable to a wide variety of processes, in fact to any process wherein fluidized solids are separately contacted with two or more gasiform streams, it will be described as applied to a process for making a hydrogen-carbon monoxide mixture from finely divided carbonaceous solids such as coke or coal. By way of example, it may be pointed out that my system is also applicable to processes for hydrocarbon conversion, oxidation, reduction, oxygen manufacture, hydrogen manufacture, absorption and desorption, calcination, distillation, etc. It will be readily apparent, for example, how my system may be employed for effecting catalytic cracking by use of catalyst and usual operating conditions as set forth in U. S. Letters Patent 2,341,193.

Referring to the accompanying drawings which form a part of this specification and in which similar parts are designated by like reference characters, Figure 1 is a schematic horizontal plan view of a simple unitary conversion chamber, Figure 2 is a schematic vertical section taken along the lines 2—2 of Figure 1, Figure 3 is another modification of a vertical section taken along the lines 2—2 of Figure 1, Figure 4 is a schematic horizontal plan of my preferred circular system employing more than two contacting zones, and Figure 5 is a detailed vertical section illustrating means for introducing gasiform streams through hollow baffles.

Referring first to Figures 1 and 2, my reaction chamber 10 may be constructed of refractory material such as firebrick and provided with an arched roof construction which avoids necessity of metallic reinforcement. The floor of the chamber is constructed to provide a means for uniformly distributing gaseous stream; it may be provided with cone-shaped or hopper-shaped depressions with gas inlets at the base thereof but it is preferably fabricated of a porous or perforated refractory tile plate 11, the space 12 under said perforated floor serving as a distributor for introduced gasiform streams.

Vertical partition baffle 13 divides the chamber into two contacting zones designated A and B and it extends downwardly to a point close to, but spaced from, floor 11 or alternatively extends to floor 11 but is provided with openings 14 adjacent floor 11. A second baffle 15 extends upwardly from floor 11 in zone B substantially parallel to baffle 13 to the height of the desired dense solids mass in zone B, for example, about 5 to 10 feet. In order to avoid channeling the space between baffles 13 and 15 is preferably separated into separate conduits by spaced baffles 16 which may extend to floor 11 but which preferably are somewhat spaced therefrom or provided with openings 17 for equalizing the amount of fluidized solids in the various wells or conduits formed by baffles 13, 15 and 16.

On the downstream side of partitioned baffle 13 (with respect to solids flow) a chimney baffle 18 extends from the floor of the chamber substantially parallel to partitioned baffle and up to the approximate level of the dense solids mass to be maintained, e. g. about 5 to 10 feet. The trough thus formed between baffles 18 and 13 may be subdivided into separate chimneys by spaced baffles 19 which may extend downwardly to the floor of the chamber and should at least extend below the level at which lift gas is introduced. The chimneys formed by baffles 13, 18 and 19 are preferably of smaller cross-sectional area than the wells or conduits formed by baffles 13, 15 and 16, the width of each chimney being, for example, only a foot more or less while the width of the wells or conduits may be about 2 feet or more. Baffles 13, 15 and 18 or equivalent spacing means also extend through the distributing space 12 as illustrated in Figure 2. Baffles 20 and 20' extend from the chamber floor to the ceiling or top of the vessel and they serve the function of causing the solids to flow in an elongated circular horizontal path, i. e. they prevent lateral short circuiting in the contacting path itself.

Fluidized solids are passed into the system via standpipe 21, and opening 22 into zone A. Solids may be removed from the system through opening 23 and withdrawn through conduit 24. The use of aerated standpipes for the introduction and withdrawal of fluidized solids through such systems is now well known to the art and requires no further description.

My first gasiform material designated charge A is introduced by line 25 into space 12 below contacting zone A. Stripping gas A is introduced under wells or conduits 26 by line 27, conduits 26 being formed in the same manner as hereinabove described in connection with baffles 13, 15 and 16. A lifting gas designated lift B is introduced by line 28 terminating at points 29 at a higher elevation in chimney 30 than the lower part or openings 14 in vertical baffle 13, chimneys 30 being formed in a manner analogous to chimneys formed by baffles 13, 18 and 19.

A second gasiform material designated charge B is introduced through line 31 into the distributing space 12' below the floor or contacting zone B. Stripping gas B is introduced through line 32 under wells or conduits joined by baffles 13, 15 and 16. Lift gas A is introduced through line 33 at points 34 above the level of openings 14 in baffle 13. Aeration gas may be introduced at the base of such chimneys and also at the base of chimneys 30 by line 35. The gasiform stream which has passed through contacting zone A together with lift gas A and stripping gas A are removed through product line 36.

In the operation of the system hereinabove described the first gasiform stream called charge A is introduced at such a rate that it will pass upwardly through zone A at such a rate as to maintain solids introduced from standpipe 21 in dense phase fluent turbulent condition, the upward vertical gas velocity in most cases being within the range of .5 to 5 feet per second or usually within the range of 1 to 3 feet per second. When the mass of fluidized solids in zone A reaches a predetermined depth the solids flow over the weir or chimney baffle 16' into wells or conduits 26 through which conduits stripping gas A is passed upwardly at a low velocity to displace the gas in which the solid particles was suspended in contacting zone A. The amount of stripping gas may vary within relatively wide limits but usually about 1 to 3 volumes of stripping gas is employed per volume of fluidized solids material which passes through the wells or conduits 26. The vertical gas velocity in such conduits may range from substantially 0 to 1 or 2 feet per second and usually does not exceed about 1½ foot per second. The aerated solids flow from the base of wells or conduits 26 through openings analogous to openings 14 into chimneys 30 wherein solids are dispersed in the gas stream introduced into line 28 and carried upwardly, preferably in dilute phase or phase of low density, into contacting zone B. The solids thus transferred in zone B settle out of the lift gas and into a dense turbulent fluidized solids mass in zone B through which gasiform charge B passes upwardly at a velocity of the order of .5 to 5 feet per second, usually about 1 to 3 feet per second. When the depth of solids in zone B exceeds the level of baffle 15 the solids overflow under the well formed by baffles 13, 15 and 16 as illustrated by Figure 2. Stripping gas introduced by line 32 displaces the gas in which solids were suspended in zone B and maintain the solids in sufficiently fluid form so that they flow through opening 14 and into the chimney formed by baffles 13, 18 and 19. The fluids are therein transferred by lift gas A from line 33 back to contacting zone A.

It will be noted that the density of the fluidized solids in contacting zones A and B have no effect whatsoever on the solids transfer system. The densities of the solids in the wells or conduits may be relatively high or relatively low without substantially interfering with solids transfer because such transfer is affected only by the solids density in the downflow wells or conduits and by gas lift in the upflow chimneys and the gas velocities in said upflow chimneys may be 10 to 20 feet or more per second. The gas lift in the chimneys is independent of the rate of gas flow through the contacting zones themselves and hence may be varied throughout a wide range without affecting conversion conditions.

In Figure 3 I have shown a modification in which the transfer zones are extended to a lower elevation than the contacting zones, baffles 15a and 18a being extended downwardly to floor 11a and baffle 13a being extended downwardly accordingly. This modification offers the advantage of providing a greater seal space since lift gases introduced through line 32a may be spaced about 2 to 10 feet or more from openings 14a thereby giving a greater bulk of fluidized solids which are constantly aerated by aeration gas introduced through line 35 to distributing space 12a. Transfer levels 16a and 19a serve the same function as baffles 16 and 19 in Figures 1 and 2, i. e. they divide the troughs into conduits and prevent lateral surging.

A particularly advantageous form of contacting apparatus is the circular chamber 38, as illustrated in Figure 4. Solids may be introduced through standpipe 21b, they may flow through contacting zone C to downcomer wells 39, then pass upwardly through chimneys 40 to contacting zone D. Thence they pass through downcomer wells 41 and chimneys 42 to contacting zone E. Solids may be withdrawn from this zone through line 24b. The circuit is completed by passing solids from zone E through downcomers 43 and chimneys 44. The transfer means in the system of Figure 4 may be essentially the same as the means described in connection with Figures 1 to 3 and hence require no further description. Incoming gaseous fluids will be distributed by means of troughs, hoppers or porous plates at the base of zones C, D and E and separate product streams will be withdrawn from each of these respective zones. It will be understood that any number of contacting zones may thus be provided.

Instead of employing metal conduits in the transfer zones for supplying lift gas, stripping gas, etc. such gases may be introduced through channels and openings in the baffle walls themselves as illustrated in Figure 5. Here baffle 15c is provided with one or more central channels or spaces 45 into which stripping gas may be introduced through line 32c. The stripping gas is injected into the downcomer wells through laterally spaced openings 46. Similarly, partition baffles 13 may be hollow or provided with channels 47 and lateral openings 48 for the introduction of stripping gas. The lift gas for chimneys may likewise be introduced through openings in the baffles themselves instead of through separate conduits. This feature of the invention is of particular importance when the temperatures are so high that metal conduits are impracticable.

To illustrate the operation of my system, carbonaceous solids such as finely divided coke may be introduced through standpipe 21 and opening 22 into zone A and preheated air may be introduced through line 25 to effect combustion of a part of said coke and to heat the unburned coke to incandescence, i. e. a temperature of about 1400 to 2500° F., e. g. about 1800° F. The flue gas withdrawn through line 36 will contain considerable sensible heat, also large amounts of carbon monoxide; the carbon monoxide may be burned externally and the heat of the flue gas together with the heat of the secondary combustion may be employed for preheating air, preheating introduced solids or the generation of steam or power. A small amount of steam may be introduced through line 27 to prevent nitrogen from being carried over with fluidized incandescent coke in contacting zone B. The lift gas introduced through line 28 in this case may be a recycled portion of the product produced in contact zone B. Steam is introduced as charge B for reaction with the incandescent coke to produce a hydrogen-carbon monoxide mixture, the temperature in zone B preferably being in the range of about 1200 to 2000° F., e. g. about 1400° F. Temperature control in zone B may be easily effected by simply regulating the amount of lift gas employed (and thus the amount of hot solids transferred) in accordance with the actual indicated temperature in zone B. By this process a product gas containing about two volumes of hydrogen to one volume of carbon monoxide and smaller amounts of carbon dioxide can be produced to serve as a charge for example to a synthesis system for the manufacture of hydrocarbons or oxygenated hydrocarbons by the Synthol, Fischer or Fischer-Tropsch processes. If the coke contains appreciable amounts of ash it may be necessary to withdraw a portion of the solids from zone B from time to time through conduit 24. Most of the unconverted solids however can be passed downwardly over weir or baffle 16 under partition baffle 13 and upwardly above chimney baffle 18 by air or other lift gas introduced through line 33. In this case it may be unnecessary to introduce any stripping gas through line 32 and in this case steam may serve as a stripping gas introduced through line 32.

When coal or other carbonaceous material containing volatile compounds is employed instead of coke, it may be desirable to employ a distillation zone in addition to the burning zone and reaction zone. Thus in Figure 4 finely divided coal is introduced into zone C and is heated therein by the hot solids transferred to zone C by chimneys 44, the solids in zone C being fluidized by superheated steam or hydrocarbon gas. The volatile material distilled (stripped) from the coal in contacting zone C may be withdrawn through a separate product line to suitable product recovery means while the non-volatile solids pass through burning zone D into reaction zone E which correspond to zones A and B respectively in the previous example. In catalytic cracking processes regeneration may be effected in zone D, a first hydrocarbon may be converted in zone E and a second hydrocarbon in zone C before the catalyst is returned to the regeneration zone. Other applications of the invention will be apparent from the above description.

I claim:

1. A fluidized solids contacting system which comprises a substantially horizontal unitary chamber provided with a bottom, an outer peripheral wall and a top, an inner wall in said chamber extending from the bottom to the top thereof and spaced from all portions of the outer wall whereby the space between the inner and outer walls provides a path for the flow of fluidized solids in a substantially horizontal plane, a plurality of transfer means spaced from each other at a substantial distance in said path for dividing said path into at least first and second contacting sections, each of said transfer means comprising a first baffle extending between the inner and outer walls and from the top to a point adjacent the bottom of the chamber to leave a passageway at a low level, a second baffle extending between the inner and outer walls and from the bottom to an intermediate level in the chamber on one side of the first baffle to provide a downflow solids conduit leading to said passageway and a third baffle extending between the inner and outer walls and from the bottom to an intermediate level in the chamber on the other side of the first baffle to provide an upflow conduit leading from said passageway, means for distributing a first gasiform stream at the bottom of the first contacting section and means for removing gasiform material from the upper part thereof, separate means for distributing a second gasiform fluid at the bottom of the second contacting section and means for removing gasiform material from the upper part thereof, and means for introducing a lift gas at a low level in each of said upflow conduits for effecting transfer of solids through the transfer means and thereby effecting fluidized solids flow in said path.

2. The contacting system of claim 1 wherein the outer peripheral wall is circular and wherein each of said baffles extends radially from the inner wall to the outer peripheral wall.

3. The contacting system of claim 1 in which the outer peripheral wall consists of side wall portions and end wall portions wherein the inner wall is spaced from and substantially parallel to said side wall portions and wherein the inner wall has ends which are spaced from said end wall portions.

4. The contacting system of claim 1 wherein the unitary chamber is constructed of refractory material and wherein the bottom of said chamber is provided with passageways for introducing and distributing gasiform material.

5. The contacting system of claim 1 wherein at least one of said baffles contains an inner open channel communicating with lateral openings in said baffle, and means for introducing a gas into said channel so that said gas may be distributed through said openings into solids adjacent said baffle.

6. The contacting system of claim 1 wherein that portion of the bottom of the chamber which is under said contacting sections is at a higher level than that portion of the bottom of the chamber which is underneath the transfer means.

7. Apparatus for contacting fluidized solids with separate gasiform streams which apparatus comprises a substantially horizontal unitary chamber provided with a bottom, an outer peripheral wall and a top, an inner wall in said chamber extending from the bottom to the top thereof and spaced from all portions of the outer wall whereby the space between the inner and outer walls provides a path for the flow of fluidized solids in a substantially horizontal plane, a plurality of baffles extending from the inner to the outer walls and from the top of the chamber substantially to the bottom thereof but providing a passageway adjacent the bottom thereof, said baffles being spaced from each other at a substantial distance in said path for dividing said path into at least first and second contacting sections, a downcomer conduit at the discharge end of each contacting section, the upper part of said conduit forming a weir for maintaining a depth of fluidized solids in the contacting section equal at least to the height of said weir and the lower part of said conduit communicating with said passageway, a chimney at the inlet end of each contacting section communicating at its lower end with the passageway which communicates in turn with the lower end of the downcomer conduit in the adjacent contacting section and provided with a vertical wall extending upwardly in the contacting section to serve as a barrier between fluidized solids therein and solids being introduced thereto, means for distributing a first gasiform stream at the bottom of the first contacting section and means for removing gasiform material from the upper part of said section, separate means for distributing a second gasiform fluid at the bottom of the second contacting section and means for removing gasiform material from the upper part thereof, and means for introducing a lift gas at a low level in each of said chimneys for effecting transfer of solids from each section to the succeeding section.

8. The apparatus of claim 7 which includes means for introducing a gasiform fluid at a low level in at least one of said downcomer conduits.

HARRY K. WHEELER, JR.

REFERENCES CITED

The following references are of record in the file of this patent:

UNITED STATES PATENTS

| Number | Name | Date |
|---|---|---|
| 2,385,446 | Jewell et al. | Sept. 25, 1945 |
| 2,419,245 | Arveson | Apr. 22, 1947 |
| 2,464,812 | Johnson | Mar. 22, 1949 |